United States Patent
Tsukamoto

(10) Patent No.: US 7,788,691 B2
(45) Date of Patent: Aug. 31, 2010

(54) TERRESTRIAL DIGITAL TV BROADCAST SIGNAL RECEIVER

(75) Inventor: Keisuke Tsukamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 982 days.

(21) Appl. No.: 11/304,584

(22) Filed: Dec. 16, 2005

(65) Prior Publication Data

US 2006/0161949 A1 Jul. 20, 2006

(30) Foreign Application Priority Data

Dec. 16, 2004 (JP) ............... 2004-364211

(51) Int. Cl.
*H04N 7/10* (2006.01)
(52) U.S. Cl. .................. 725/50; 348/429.1
(58) Field of Classification Search .......... 725/37, 725/39, 50, 51, 52, 53
See application file for complete search history.

(56) References Cited

U.S. PATENT DOCUMENTS

| | | | | |
|---|---|---|---|---|
| 5,592,551 A | * | 1/1997 | Lett et al. | 380/211 |
| 5,635,989 A | * | 6/1997 | Rothmuller | 725/46 |
| 6,337,719 B1 | * | 1/2002 | Cuccia | 348/731 |

FOREIGN PATENT DOCUMENTS

| | | |
|---|---|---|
| JP | 2001-136453 A | 5/2001 |
| JP | 2002-142163 A | 5/2002 |
| JP | 2004-228992 A | 8/2004 |

* cited by examiner

*Primary Examiner*—Rafael Pérez-Gutiérrez
*Assistant Examiner*—Marcos Batista
(74) *Attorney, Agent, or Firm*—Crowell & Moring LLP

(57) ABSTRACT

In a terrestrial digital TV broadcast signal receiver capable of EPG (Electric Program Guide) display, EPG data are updated in a time as smaller as possible while a use does not watch any TV program, so that the EPG can be displayed in real time just after switching on of an electric power of the terrestrial digital TV broadcast signal receiver. When the electric power is switched off, an EPG data of a channel which will be lost the earliest is searched among the EPG data stored in the memory, and a time of day when the EPG data of the searched channel is lost is calculated. When a time for taking new EPG data reaches, the tuner is tuned to the channel, and a TV broadcast signal is received and a new EPG data is extracted from the received TV broadcast signal and stored in the memory.

6 Claims, 4 Drawing Sheets

TERRESTRIAL DIGITAL TV BROADCAST SIGNAL RECEIVER

BACKGROUND OF THE INVENTION

1. Field of the Invention

The present invention relates to a terrestrial digital television broadcast signal receiver (hereinafter, abbreviated as TV broadcast signal receiver), and especially relates to a TV broadcast signal receiver which can update an electronic program guide automatically while a user watches no TV program.

2. Description of the Related Art

In a terrestrial digital TV broadcast, information relating to programs such as an electronic program guide (hereinafter, abbreviated as EPG (Electronic Program Guide)) other than picture signal, audio signal, a transmission control signal, and so on is included in the TV broadcast signal transmitted from a TV station of each channel. The EPG includes information relating to a broadcast such as TV programs which are scheduled for transmission in the channel and air time zones or intersections thereof. There is a TV broadcast signal receiver which receives EPG data from the TV broadcast signal transmitted from a TV station of each channel which can be received, to make a synoptic table of the EPGs, and to display the synoptic table on a screen of a display apparatus. A user can easily find and choose a TV program which he/she wants to watch from the synoptic table of the EPGs displayed on the screen of the display apparatus, and can reserve the reception and reproduction or recording of the TV program.

The EPG is included in the TV broadcast signal transmitted from each TV station at a constant time interval. When the user continuously watches a TV program or TV programs of a specific channel, the EPG data of the specific channel is taken into the TV broadcast signal receiver at the constant time interval, so that the EPG data is automatically updated. With respect to the channels that the TV programs thereof are not watched by the user, the EPG data of the channels are not taken and not updated. In the technical standard, the EPG data should include one week of contents. It is usually the case, however, that the EPG data includes contents of about one day or less. Therefore, when the EPG data is not updated, the contents of the EPG are eliminated with passage of time, and finally, all the EPG data may be lost as outdated information. Then, the EPG of the specific channel is not displayed on the screen of the display apparatus.

When the user switches on the TV broadcast signal receiver so as to display the EPG on the screen of the display apparatus after the EPG data of a specific channel or all channels is/are lost, the TV broadcast signal receiver tunes a frequency of a tuner to the channel that has lost its EPG data, and receives the TV broadcast signal of the channel. Then, the EPG data is taken from the received TV broadcast signal, and the EPG of the channel is displayed on the screen of the display apparatus.

By the way, since the EPG data is included in the TV broadcast signal at a constant time interval, a predetermined time is necessary for the EPG data to be received by the TV broadcast signal receiver. Furthermore, when the EPG data of a plurality of channels are lost, it is necessary to take the EPG data about all the channels that have lost their EPG data. Generally, the TV broadcast signal receiver cannot receive TV broadcast signals of a plurality of channels simultaneously, so that a time necessary for taking the EPG data of the channels becomes much longer. Therefore, there is a problem that a constant time lag occurs before the EPG is really displayed on the screen of the display apparatus, after choosing a mode for displaying the EPG on the screen of the display apparatus by operation of the wireless remote controller by the user.

For solving the above-mentioned problem, a conventional TV broadcast signal receiver shown in Japanese Laid-Open Patent Publication No. 2001-136453 automatically sets an update time for taking new EPG data on the basis of information of a delivery plan included in the EPG data previously taken, switches on the electric power when it reaches the update time for taking the EPG data, and switches off the power after setting the next update time. In this conventional TV broadcast signal receiver, the EPG data of a channel to be updated, however, cannot be taken, if the user watches a TV program of a different channel at the update time. Therefore, there is a case that the EPG can not be displayed on a screen of a display apparatus immediately, even when the user tries to display the EPG on the screen of the display apparatus. On the other hand, a time of a TV program which is actually delivered is generally longer than the time interval of the EPG data included in the TV broadcast signal, so most of the contents of the updated EPG data is the same as that of the EPG data previously taken. Therefore, if the EPG data is updated at each time of delivery of the EPG data, electric power used for updating the EPG data is wasted. On the other hand, when menu display is performed to let the user choose either update time among a plurality of update times, not only a display program of the TV broadcast signal receiver becomes complex, but also a setting operation of the update time by the user becomes complex and troublesome.

Another conventional TV broadcast signal receiver shown in Japanese Laid-Open Patent Publication No. 2002-142163 stores EPG data taken in the TV broadcast signal receiver in a nonvolatile memory when an electric power is switched off, and reads out the EPG data stored in the nonvolatile memory so as to display the EPG on a screen of a display apparatus when the electric power is switched on next. The EPG data, however, are eliminated with passage of time as mentioned above. Thus, the EPG cannot be displayed because all of the EPG data may be lost when the electric power has not been switched on during a predetermined period of time.

Still another conventional TV broadcast signal receiver shown in Japanese Laid-Open Patent Publication No. 2004-228992 has two tuners, one is used for receiving a TV broadcast signal of a specific channel which is watched by a user and the other is used for receiving a TV broadcast signal of a channel which is not watched by the user so as to take the EPG data therefrom. The TV broadcast signal receiver having two tuners, however, is expensive, and is wasteful because one of the tuners is used for receiving only the EPG data.

SUMMARY OF THE INVENTION

The present invention solves the problems mentioned above and provides a terrestrial digital TV broadcast signal receiver which can update EPG data as few times as possible while a user does not watch any TV program and can display the EPG on a screen on a display apparatus in real time just after switching on of electric power with using only one tuner and no setting operation by the user.

A terrestrial digital TV broadcast signal receiver in accordance with an aspect of the present invention takes an EPG (Electronic Program Guide) data from a received TV (Television) broadcast signal with respect to each receivable channel, stores the EPG data of each channel in a memory, reads out the EPG data from the memory and displays the EPG of each channel on a screen of a display apparatus when a user chooses to display the EPG.

When contents of an EPG data of a channel previously stored in the memory is eliminated with passage of time and finally lost because the contents are finished, a TV broadcast signal of the channel is received, new EPG data is extracted from the received TV broadcast signal and the new EPG data is stored in the memory, while the electric power of the TV broadcast signal receiver is switched off.

By such a configuration, since EPG data are updated in a time as smaller as possible while a user does not watch any TV program, the EPG can be displayed in real time just after switching on of an electric power of the terrestrial digital TV broadcast signal receiver.

In the above-mentioned terrestrial digital TV broadcast signal receiver, it is preferable that when an electric power of the terrestrial digital TV broadcast signal receiver is switched off, an EPG data of a channel which will be lost the earliest is searched among the EPG data stored in the memory, and a time of day when the EPG data of the searched channel is lost is calculated, and when a time for taking new EPG data is reached, a tuner is tuned to the channel, a TV broadcast signal is received and a new EPG data is extracted from the received TV broadcast signal and stored in the memory.

By such a configuration, the EPG data which is eliminated with passage of time is updated while the electric power of the terrestrial digital TV broadcast signal receiver is switched off, that is, the user does not watch any TV program, so that the EPG data of each receivable channel is normally stored in the memory at the moment of switching on of the electric power except a rare case that the user switches on the electric power during the update of the EPG data. Thereby, the EPG can be displayed in real time just after switching on of an electric power of the terrestrial digital TV broadcast signal receiver. Each EPG data are not updated until all contents thereof are lost, so that the number of updates of each EPG data can be made as small as possible. Consequently, it is possible to reduce the power consumption of the terrestrial digital TV broadcast signal receiver. Furthermore, the user operates no setting with respect to the update of the EPG data, so that the burden on the user can be reduced.

DETAILED DESCRIPTION OF THE EMBODIMENT

Figure 1:
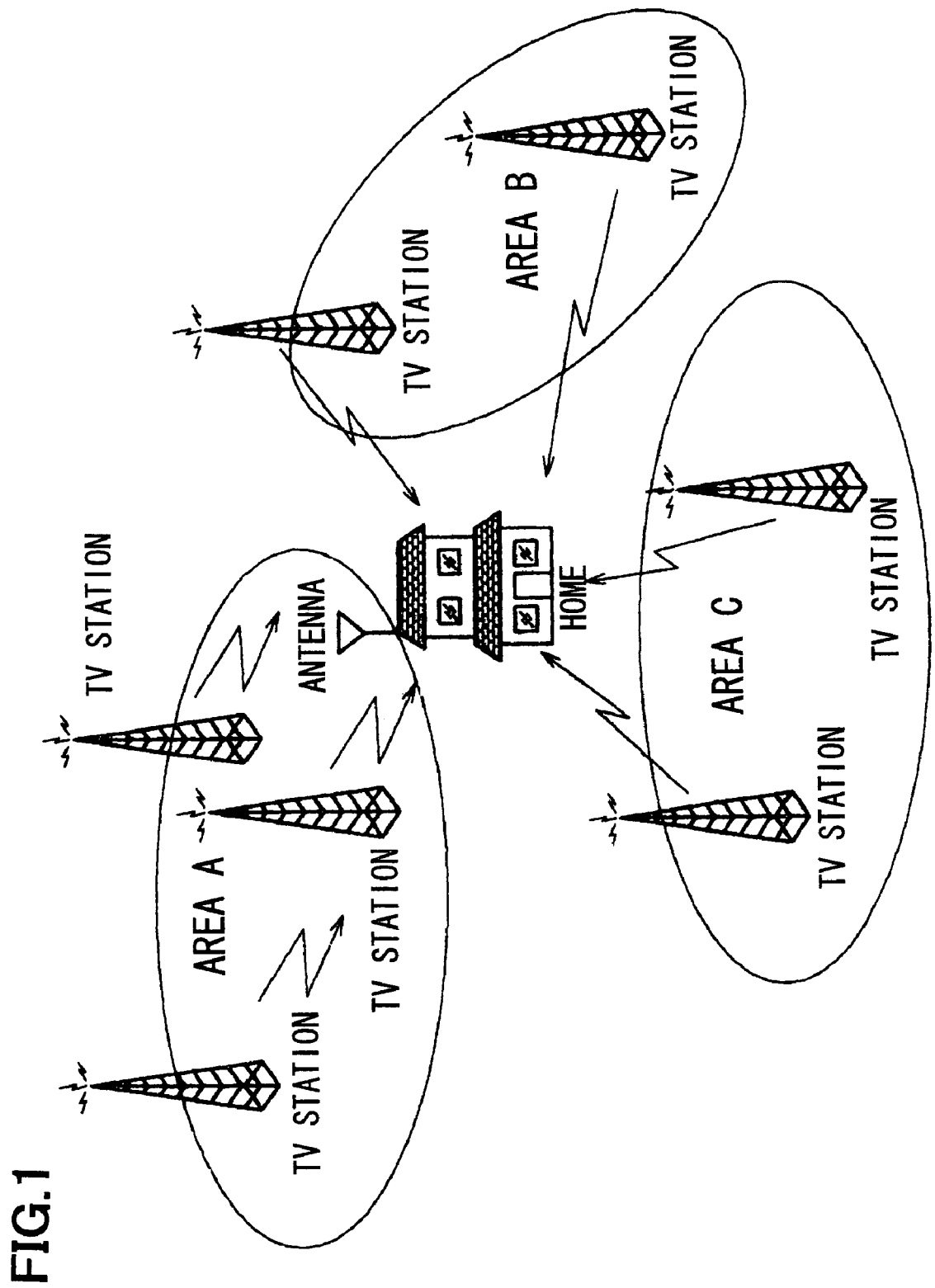
FIG. 1 is a conceptual diagram showing a circumstance that a user receives a digital television (TV) broadcast signal in home.

A terrestrial digital TV broadcast signal receiver (it is abbreviated as TV broadcast signal receiver) in accordance with an embodiment of the present invention is described. FIG. 1 shows a circumstance in which a user receives a TV broadcast signal in home. In an area where terrestrial digital TV broadcast is performed, when an intensity of received digital TV broadcast signal is equal to or larger than a predetermined threshold, a picture image of a constant quality can be obtained by compensation or the like. Therefore, it is possible to watch TV programs by receiving TV broadcast signals transmitted from TV stations which are respectively placed in for example, areas designated by symbols "A", "B", "C", and so on, as shown in FIG. 1.

Each TV station transmits EPG data including information relating to TV programs such as starting and ending times, category, title, outline, main casts of each TV program delivered from itself with audio signal and picture signal as a TV broadcast signal. The EPG data is originally formed and independently delivered for each TV channel. Therefore, a time of day of the delivery of the EPG data or an amount of information of the EPG data delivered in one time in each channel are varied corresponding to, for example, a number of TV programs included in the EPG data. Thus, the TV broadcast signal receiver receives the TV broadcast signals of all receivable channels, takes the EPG data from the received TV broadcast signals, stores the EPG data in a memory, and displays the EPG data of a specific channel or all channels on a screen of a display apparatus.

Figure 2:
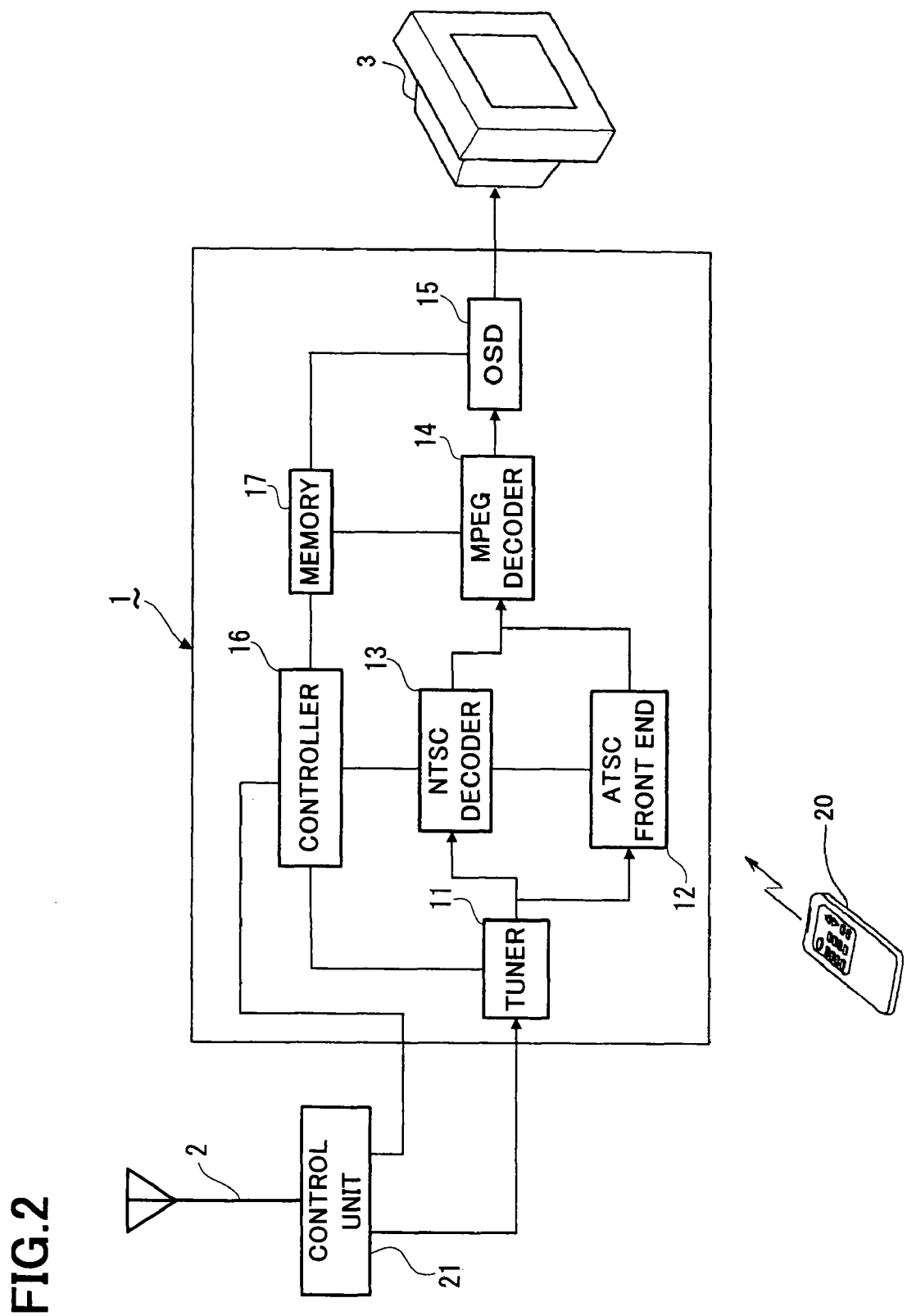
FIG. 2 is a block diagram showing a configuration of a digital TV broadcast signal receiver in accordance with an embodiment of the present invention.

A configuration of a TV broadcast signal receiver in accordance with this embodiment is shown in FIG. 2. In the TV broadcast signal receiver 1, a tuner 11 serving as a TV broadcast signal receiving means is connected to a multi-directional antenna 2, and receives a TV broadcast signal through the multi-directional antenna 2. An ATSC front end 12 decodes a digital TV broadcast signal received by the tuner 11 after performing a predetermined process. An NTSC decoder 13 decodes an analogous TV broadcast signal received by the tuner 11. An MPEG decoder 14 decodes the TV broadcast signal which is compressed in compliance with MPEG technical standard. An OSD (On Screen Display) unit 15 performs a process for superimposing a predetermined display image on the decoded TV broadcast signal. A controller 16 not only detects a signal receiving condition of the TV broadcast signal received by the tuner 11 so as to control a control unit 21 of the multi-directional antenna 2, but also controls the ATSC front end 12 and the NTSC decoder 13, and so on. A memory 17 stores the decoded TV broadcast signal temporarily and stores data of the display image which is to be displayed on the decoded TV broadcast signal. These elements configure the TV broadcast signal receiver 1. The TV broadcast signal decoded by the MPEG decoder 14 is outputted to and displayed on a display apparatus 3 through the OSD unit 15.

As mentioned above, since the EPG data is included in the TV broadcast signal, the MPEG decoder 14 serves as an EPG data taking means, extracts the EPG data from the decoded TV broadcast signal, and stores the extracted EPG data in the memory 17 with respect to each channel. The controller 16 is constituted by a ROM which memorizes control programs and so on, a CPU for carrying out the control programs and a timer. The controller 16 serves as an EPG image forming means and an EPG data updating means, reads out a data stored in the memory 17 and stores a data in the memory 17 temporarily, according to need. The memory 17 may be configured by a volatile memory such as D-RAM, or a nonvolatile memory such as a hard disk or a flash memory.

When a user chooses to display an EPG image on a screen of the display apparatus 3, the controller 16 serves as the EPG image forming means, reads out the EPG data of each channel stored in the memory 17 and forms a display image of a synoptic table of the EPG so as to be displayed on a screen of a display apparatus. Then, the display image is displayed on the screen of the display apparatus 3 through the OSD unit 15.

Since the TV broadcast signal receiver 1 has only one tuner 11, it is impossible to receive more than one channel of TV broadcast signals at the same time. Therefore, the TV broadcast signal receiver 1 usually utilizes a time when a user watches a TV program, and it takes an EPG data of the receiving channel from a receiving TV broadcast signal and stores the EPG data in the memory 17, temporarily. By repeating the same operation whenever the user changes the receiving channel, the EPG data of the channels which were chosen by the user are stored in the memory 17. With respect to a channel which is not chosen by the user, the TV broadcast signal is not received at all, so that no EPG data is taken. Furthermore, with respect to a channel to which the signal receiving operation has not been performed in a predetermined term, the contents of the EPG data is eliminated with passage of time, and finally the EPG data will be lost.

Therefore, the TV broadcast signal receiver 1 in this embodiment takes and updates the EPG data of a channel, with which the EPG data previously taken was lost, as a trigger by power off actuation when the user operates a wireless remote controller (operation means) 20 to switch off the electric power. Actually, the EPG data stored in the memory 17 is not erased until a reset action is performed, but it is expressed as "lost" because the EPG data that is past the current time of the timer of controller 16 is not used for the EPG display. In addition, the term "power off" denotes a stand-by state that a signal from the wireless remote controller 20 is receivable. The term "updating" denotes the operation to erase the past EPG data stored in the memory 17 and the EPG data taken newly is stored in the memory 17.

Figure 3A:
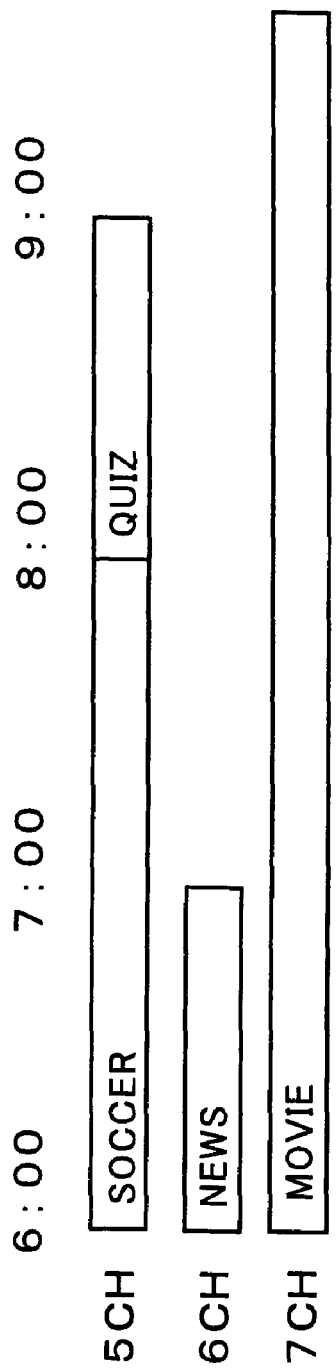
FIGS. 3A and 3B are schematic views showing EPG data of each channel stored in a memory in the embodiment.
Figure 3B:
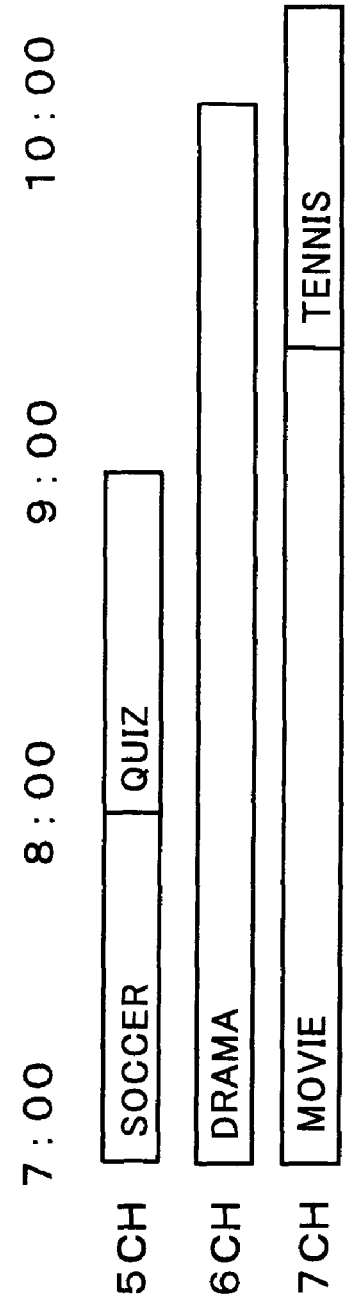

FIGS. 3A and 3B, respectively, show the EPG data of each channel stored in the memory 17 visually. The loss of the EPG data is described with reference to three channels of a fifth channel (5CH), a sixth channel (6CH) and a seventh channel (7CH) as examples. In FIGS. 3A and 3B, the abscissa designates the time passage, and the EPG data are lost sequentially from the left side in the figure. FIG. 3A shows an example of the EPG data stored in the memory 17 when the user switched off the electric power at 6:00 p.m. At this time, the EPG data of the fifth channel (5CH) remains until 9:00 p.m. The EPG data of the seventh channel (7CH) remains until 9:00 p.m. or later. In contrast, the EPG data of the sixth channel (6CH) remains only until 7:00 p.m. FIG. 3B shows the EPG data at 7:00 p.m. where the past EPG data of the sixth channel (6CH) is lost and new EPG data of the sixth channel is taken. Although it is not illustrated, since the EPG data of the fifth channel (5CH) will be lost at 9:00 p.m., new EPG data of the fifth channel will be taken.

By such a configuration, the EPG data of all receivable channels are stored in the memory 17 while the electric power of the TV broadcast signal receiver is switched off, so that it is possible to display a synoptic table of the EPG of all the receivable channels on the screen of the display apparatus even when the user chooses to display the EPG display just after switching on the electric power of the TV broadcast signal receiver.

Figure 4:
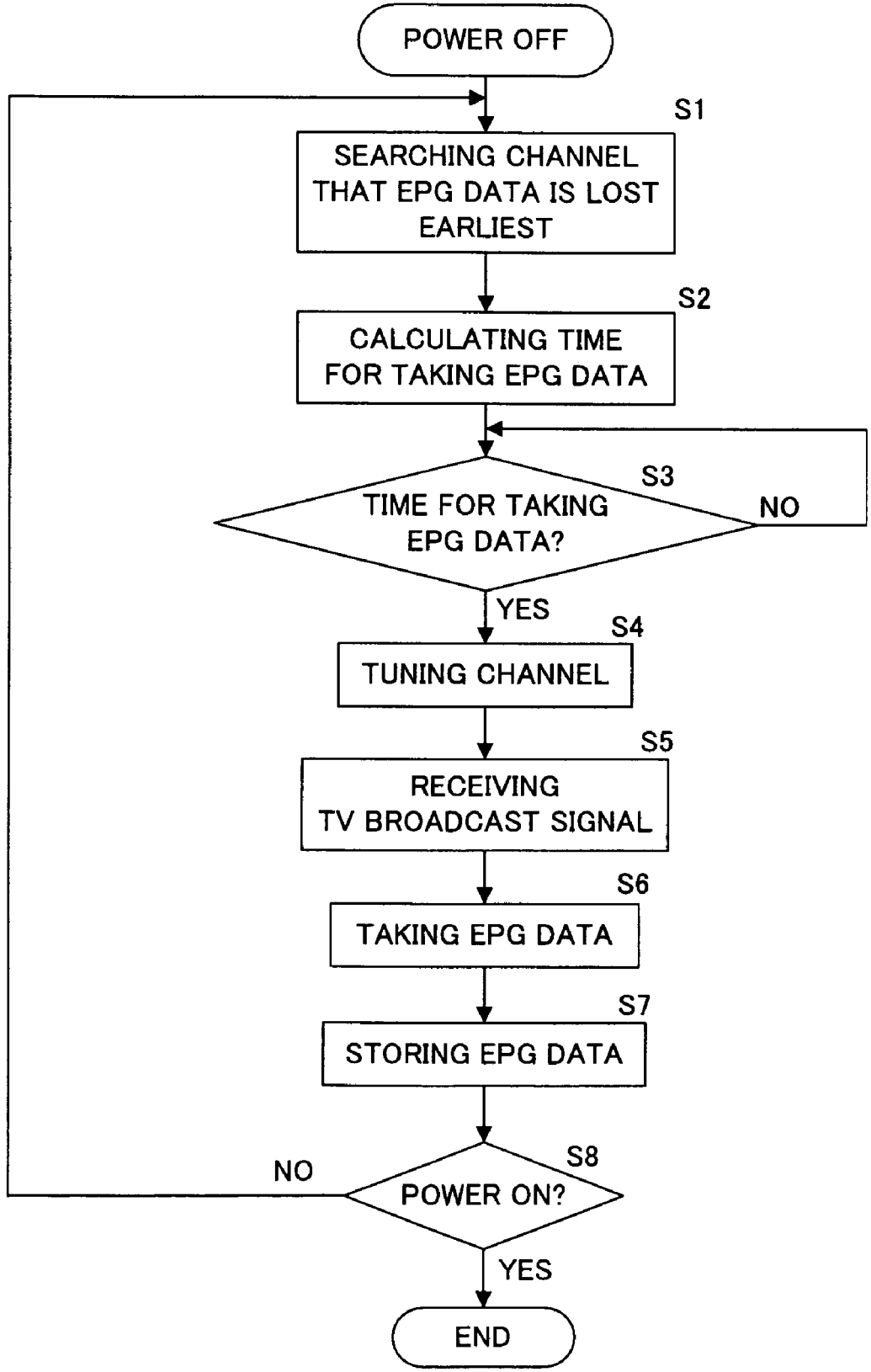
FIG. 4 is a flowchart showing an operation for taking the EPG data while electric power is switched off in the embodiment.

Subsequently, an operation for taking the EPG data while the electric power of the TV broadcast signal receiver is switched off is described with reference to a flowchart shown in FIG. 4.

When the user operates the wireless remote controller 20 so as to switch off the electric power of the TV broadcast signal receiver 1, the controller 16 serves as the EPG data updating means, and searches an EPG data of a channel which will be lost the earliest among the EPG data of each channel stored in the memory 17 (S1). Then, the controller 16 calculates a time of day when the EPG data of the searched channel is lost or when new EPG data of the searched channel should be taken (S2). The time when the new EPG data of the searched channel is taken is not necessarily the same as the time when the EPG data of the searched channel is lost, so that it may be the nearest delivery time of the EPG data. The controller 16 waits for the time for taking new EPG data (S3), tunes a frequency of the tuner 11 to the frequency of the TV broadcast signal of the channel (S4), and receives the TV broadcast signal when it reaches the time for taking new EPG data (S5). The ATSC front end 12 and the MPEG decoder 14 decode the received TV broadcast signal after processing predetermined signal processing, and the controller 16 takes only the EPG data (S6). The EPG data taken by the controller 16 is stored in the memory 17 (S7). The above-mentioned steps are repeatedly carried out for taking new EPG data of a channel that lost its previously taken EPG data until the electric power of the TV broadcast signal receiver is switched on (S8).

In the above-mentioned embodiment, it is described that the new EPG data of each channel is taken when the EPG data previously taken is lost. The present invention, however, is not limited to this case. It is sufficient that the TV broadcast signal receiver is constituted to receive a TV broadcast signal of a channel, to extract new EPG data from the received TV broadcast signal and to store the new EPG data in a memory, when contents of the EPG data of the channel previously stored in the memory is eliminated with passage of time and finally lost because the contents are finished, while the electric power of the TV broadcast signal receiver is switched off. Other configurations of the TV broadcast signal receiver can be modified in various ways. For example, it may be constituted that when the EPG data of a specific channel is lost, not only the EPG data of the specific channel but also the EPG data of other channels may be serially updated.

Furthermore, the terrestrial digital TV broadcast signal receiver in accordance with in the present invention is not limited to the tuner for receiving terrestrial digital TV broadcast signal, and it may be a TV receiver or a DVD recorder having a tuner facility, a DVD recorder.

This application is based on Japanese patent application 2004-364211 filed Dec. 16, 2004 in Japan, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A terrestrial digital TV broadcast signal receiver which takes an EPG (Electronic Program Guide) data from a received TV (Television) broadcast signal with respect to each receivable channel, stores the EPG data of each channel into a memory, reads out the EPG data from the memory and displays an EPG of each channel on a screen of a display apparatus when a user chooses to display the EPG, wherein when contents of the EPG data of a channel previously stored in the memory are eliminated with passage of time and finally lost because the contents have finished being broadcast, a TV broadcast signal of the channel is received, new EPG data is extracted from the received TV broadcast signal and the new EPG data is stored in the memory, while electric power of the TV broadcast signal receiver is switched off such that the TV broadcast signal receiver is in a stand-by power state, wherein when the electric power of the TV broadcast signal receiver is in the stand-by power state, an EPG data of a channel which will be lost the earliest is searched among the EPG data stored in the memory, and a time of day when the EPG data of the searched channel is lost is calculated; and when a time for taking new EPG data is reached, a tuner is tuned to the searched channel, a TV broadcast signal is received and a new EPG data is extracted from the received TV broadcast signal and stored in the memory.

2. The terrestrial digital TV broadcast signal receiver in accordance with claim 1, wherein
the time for taking the new EPG data is the time of day when the EPG data of the searched channel is lost.

3. The terrestrial digital TV broadcast signal receiver in accordance with claim 1, wherein
the time for taking the new EPG data is an earliest time of day when the new EPG data is available to be received.

4. The terrestrial digital TV broadcast signal receiver in accordance with claim 1, wherein
when the EPG data of a specific channel is lost, not only the EPG data of the specific channel but also the EPG data of other channels are serially updated.

5. A terrestrial digital TV broadcast signal receiver comprising:
a TV broadcast signal receiving means connected to an antenna and receiving a TV broadcast signal of each receivable channel transmitted from a TV station of the channel;
a digital signal processing means performing predetermined signal processing to a digital TV broadcast signal received by the TV broadcast signal receiving means so as to decode the digital TV broadcast signal;
an EPG (Electronic Program Guide) data taking means extracting an EPG data from the decoded digital TV broadcast signal;
a memory means storing the EPG data of each channel;
an EPG image forming means reading the EPG data of each channel stored in the memory means and forming a display image of synoptic table of EPG which can be displayed on a screen of a display apparatus when a user selects to display the EPG;
an operation means operated by the user for switching on and off of an electric power of the terrestrial digital TV broadcast signal receiver and for selecting at least displaying an EPG image on the screen of the display apparatus; and
an EPG data updating means, receiving a TV broadcast signal of a channel, takes a new EPG data from the received TV broadcast signal, and stores the new EPG data into the memory means when all contents of an EPG data of the channel previously taken and stored in the memory means are eliminated with passage of time and the EPG data is lost, while the electric power is switched off such that the TV broadcast signal receiving means is in a stand-by power state, wherein
the EPG data updating means searches an EPG data of a channel which will be lost earliest among the EPG data of each channel stored in the memory means, and calculates a time of day when the EPG data of the searched channel is lost or when new EPG data of the searched channel should be taken;
when a time for taking new EPG data is reached, the EPG data taking means tunes the TV broadcast signal receiving means to the searched channel, and receives the TV broadcast signal;
the EPG data taking means extracts an EPG data from the received TV broadcast signal and stores the extracted EPG data in the memory means; and
the EPG data taking means repeatedly carries out the above steps for taking new EPG data of a channel that lost the EPG data previously taken until the electric power of the TV broadcast signal receiver is switched on, thereby EPG data are serially updated with respect to channels that lost the EPG data so that the EPG can be displayed on a screen of a display apparatus in real time when the user chooses to display the EPG just after switching on the electric power.

6. The terrestrial digital TV broadcast signal receiver in accordance with claim 5, wherein
the TV broadcast signal receiving means receives only one TV broadcast signal of one channel.

* * * * *